United States Patent
Kimura et al.

(10) Patent No.: US 11,340,586 B2
(45) Date of Patent: May 24, 2022

(54) NUMERICAL CONTROLLER

(71) Applicant: Fanuc Corporation, Yamanashi (JP)

(72) Inventors: Satoshi Kimura, Yamanashi (JP); Akira Kanemaru, Yamanashi (JP)

(73) Assignee: Fanuc Corporation, Yamanachi (JP)

( * ) Notice: Subject to any disclaimer, the term of this patent is extended or adjusted under 35 U.S.C. 154(b) by 0 days.

(21) Appl. No.: 16/282,719

(22) Filed: Feb. 22, 2019

(65) Prior Publication Data
US 2019/0271968 A1  Sep. 5, 2019

(30) Foreign Application Priority Data
Mar. 2, 2018 (JP) .............................. JP2018-037318

(51) Int. Cl.
*G05B 19/4155* (2006.01)
*G05B 19/4068* (2006.01)

(52) U.S. Cl.
CPC ..... *G05B 19/4155* (2013.01); *G05B 19/4068* (2013.01)

(58) Field of Classification Search
CPC ............ G05B 2219/36045; G05B 2219/33297
USPC ......................................................... 700/159
See application file for complete search history.

(56) References Cited

U.S. PATENT DOCUMENTS

| | | | |
|---|---|---|---|
| 5,210,859 A * | 5/1993 | Aoshima | G06F 11/323 714/46 |
| 5,748,878 A * | 5/1998 | Rees | G06F 11/3466 714/38.13 |
| 5,933,640 A * | 8/1999 | Dion | G06F 8/433 717/132 |
| 6,397,111 B1 | 5/2002 | Niwa | |
| 2011/0191758 A1* | 8/2011 | Scharf | G06F 12/00 717/151 |

(Continued)

FOREIGN PATENT DOCUMENTS

| | | |
|---|---|---|
| CN | 101414167 A | 4/2009 |
| CN | 101609321 A | 12/2009 |
| CN | 101739295 A | 6/2010 |

(Continued)

OTHER PUBLICATIONS

Notice of Reasons for Refusal for Japanese Application No. 2018-037318, dated Mar. 3, 2020, with translation, 6 pages.

(Continued)

*Primary Examiner* — Emilio J Saavedra
(74) *Attorney, Agent, or Firm* — RatnerPrestia (57) ABSTRACT

Provided is a numerical controller having a function for dynamically analyzing a machining program.
The numerical controller provided with a subprogram calling function that calls a subprogram in a machining program includes: a program interpretation unit that notifies information related to the call of the subprogram when the subprogram is called; a program calling information storage unit that aggregates and stores the information related to the call of the subprogram that is notified by the program interpretation unit; a program execution unit that notifies information related to execution of a subprogram when executing the subprogram; and a program execution information storage unit that aggregates and stores the information related to the execution of the subprogram that is notified by the program execution unit.

3 Claims, 6 Drawing Sheets

(56) References Cited

U.S. PATENT DOCUMENTS

2014/0317452 A1* 10/2014 Tonouchi ............ G06F 11/3604
714/38.1

FOREIGN PATENT DOCUMENTS

| | | | | | |
|---|---|---|---|---|---|
| JP | 02114302 | A | | 4/1990 | |
| JP | 5-113818 | A | | 5/1993 | |
| JP | 05113818 | A | * | 5/1993 | .............. C25D 5/12 |
| JP | 0633207 | U | | 4/1994 | |
| JP | 07129220 | A | * | 5/1995 | .............. C25D 5/12 |
| JP | 8-063218 | A | | 3/1996 | |
| JP | 2000035815 | A | * | 2/2000 | |

OTHER PUBLICATIONS

Chinese Office Action for Chinese Application No. 201910160562.5, dated Apr. 27, 2021, with translation, 16 pages.

\* cited by examiner

| PROGRAM NAME | CALLING INFORMATION | | | | |
|---|---|---|---|---|---|
| | CALLER | MEANS | SET VALUE | ... | ... |
| O0001 | - | - | ... | ... | ... |
| O1001 | O0001 | M98 #100 | #100 = 1001 | ... | ... |
| O2001 | O0001 | M50 Prm6042 | Prm6042 = 2001 | ... | ... |
| O3001 | O0001 | T23 | ... | ... | ... |
| O3011 | O3001 | G500 | ... | ... | ... |
| O0001 | - | - | ... | ... | ... |
| O1002 | O0001 | #100 | ... | ... | ... |
| O2002 | O0001 | M50 Prm6042 | Prm6042 = 2002 | ... | ... |
| O3001 | O0001 | T23 | ... | ... | ... |
| O3021 | O3001 | M96 | ... | ... | ... |
| ... | ... | ... | ... | ... | ... |

FIG. 4

| PROGRAM NAME | EXECUTION INFORMATION | | | | |
|---|---|---|---|---|---|
| | CALLER | EXECUTION FREQUENCY | EXECUTION TIME (sec) | ... | ... |
| O0001 | - | 1 | 500 | ... | ... |
| O1001 | O0001 | 1 | 100 | ... | ... |
| O2001 | O0001 | 1 | 125 | ... | ... |
| O3001 | O0001 | 1 | 150 | ... | ... |
| O3011 | O3001 | 1 | 50 | ... | ... |
| O0001 | - | | | ... | ... |
| O1002 | O0001 | 1 | 110 | ... | ... |
| O2002 | O0001 | 1 | 120 | ... | ... |
| O3001 | O0001 | 1 | 140 | ... | ... |
| O3021 | O3001 | 1 | 40 | ... | ... |
| ... | ... | ... | ... | ... | ... |

FIG. 5

MACHINING PROGRAM EXECUTION RESULT

| PROGRAM NAME | CALLER | MEANS | SET VALUE | EXECUTION FREQUENCY | EXECUTION TIME (sec) | ... |
|---|---|---|---|---|---|---|
| O0001 | - | - | ... | 1 | 500 | ... |
| O1001 | O0001 | M98 #100 | #100 = 1001 | 1 | 100 | ... |
| O2001 | O0001 | M50 Prm6042 | Prm6042 = 2001 | 1 | 125 | ... |
| O3001 | O0001 | T23 | ... | 1 | 150 | ... |
| O3011 | O3001 | G500 | ... | 1 | 50 | ... |
| O0001 | - | - | ... | 1 | | ... |
| O1002 | O0001 | #100 | ... | 1 | 110 | ... |
| O2002 | O0001 | M50 Prm6042 | Prm6042 = 2002 | 1 | 120 | ... |
| O3001 | O0001 | T23 | ... | 1 | 140 | ... |
| O3021 | O3001 | M96 | ... | 1 | 40 | ... |
| ... | ... | ... | ... | ... | ... | ... |

NUMERICAL CONTROLLER

RELATED APPLICATIONS

The present application claims priority to Japanese Patent Application Number 2018-037318 filed Mar. 2, 2018, the disclosure of which is hereby incorporated by reference herein in its entirety.

BACKGROUND OF THE INVENTION

1. Field of the Invention

The present invention relates to a numerical controller, and particularly relates to a numerical controller having a function for dynamically analyzing a machining program.

2. Description of the Related Art

In a machining program used in a numerical controller (hereinafter, solely called as a program), other program is sometimes called in the program. Hereinafter, a program that is firstly executed in an operation of the numerical controller is denoted as a main program, and other program that is called according to the execution of the main program is denoted as a subprogram. For example, in the main program, a subprogram is called by an MSTB code (a generic name of a code having a form such as Mxxx, Sxxx, Txxx and Bxxx, where xxx denotes a code that designates the subprogram to be called), and a subprogram is called by a G code (a code having a form of Gxxx, where xxx denotes a code designating the subprogram to be called). Also, the subprogram further calls a subprogram, that is, such a call is sometimes executed multiply. For example, there is a program configured as a main program that calls a plurality of subprograms which are respectively created corresponding to kinds of machining.

In the above-described case, many programs exist in the numerical controller, so that various means for easily controlling these programs have been proposed. For example, in JP H5-113818 A and JP H8-063218 A disclose a technique for statically analyzing a program including multiple call, and visually displaying a hierarchical structure of the program.

In the case of program analysis by static analysis as described in JP H5-113818 A and JP H8-063218 A, none of a macro variable, parameter setting, an execution condition of numerical controller software (an internal parameter) and the like is considered, whereby it is impossible to check a situation of the numerical controller when actually operating the program.

That is, when the program is actually executed, existence of a subprogram that is described in a program code but is not called cannot be sometimes checked by the static analysis. For example, even if the above-described macro variable, parameter and internal parameter are used as a branch condition, and calling of a subprogram is defined at a branch destination, there is a case that the subprogram at the branch destination is not actually called depending on values of the macro variable, parameter and internal parameter.

Such an event can be a problem, for example, in a scene of a test of the program. Although such a program that is not actually called is unnecessary and thus is desirable to be deleted, it is not easy to check whether respective programs existing in the numerical controller are actually executed or not. This also means that it is difficult to check presence or absence of testing omission. In particular, in an environment where a plurality of operators use one numerical controller, there are many cases that many programs are registered in the numerical controller, so that the above-described problem is likely to be caused. If it is possible to easily check whether respective programs are actually executed or not, a storage area in the numerical controller can be utilized efficiently, and such a test of the program can be executed securely without causing the testing omission.

The present invention is made in order to solve such a problem, and aims to provide a numerical controller having a function for dynamically analyzing a machining program.

SUMMARY OF THE INVENTION

The numerical controller according to one embodiment of the present invention is a numerical controller provided with a subprogram calling function that calls a subprogram in a machining program, and includes: a program interpretation unit that notifies information related to the call of the subprogram when the subprogram is called; a program calling information storage unit that aggregates and stores the information related to the call of the subprogram that is notified by the program interpretation unit; a program execution unit that notifies information related to execution of the subprogram when executing the subprogram; and a program execution information storage unit that aggregates and stores the information related to the execution of the subprogram that is notified by the program execution unit.

The numerical controller according to one embodiment of the present invention includes a program calling information display unit that displays a calling structure of the subprogram by a tree view based on the information aggregated by the program calling information storage unit and the program execution information storage unit.

The numerical controller according to one embodiment of the present invention includes a program calling information display unit that outputs a list of the executed subprogram based on the information aggregated by the program execution information storage unit.

The numerical controller according to one embodiment of the present invention includes a program calling information display unit that outputs a list of the subprogram that is reserved to be called but are not executed based on the information aggregated by the program calling information storage unit and the program execution information storage unit.

The numerical controller according to one embodiment of the present invention includes: a program management unit that stores one or more of the subprogram; and a program calling information display unit that outputs a list of the subprogram that is not executed based on a list of the subprogram stored in the program management unit and the information aggregated by the program execution information storage unit.

According to one embodiment of the present invention, it is possible to provide a numerical controller having a function for dynamically analyzing a machining program.

BRIEF DESCRIPTION OF THE DRAWINGS

Above-described and other objects and features of the present invention will be clarified with reference to attached drawings and by following description of examples. Among these drawings.

DETAILED DESCRIPTION OF THE PREFERRED EMBODIMENTS

A configuration of a numerical controller 1 according to an embodiment of the present invention will be described.

Figure 1:
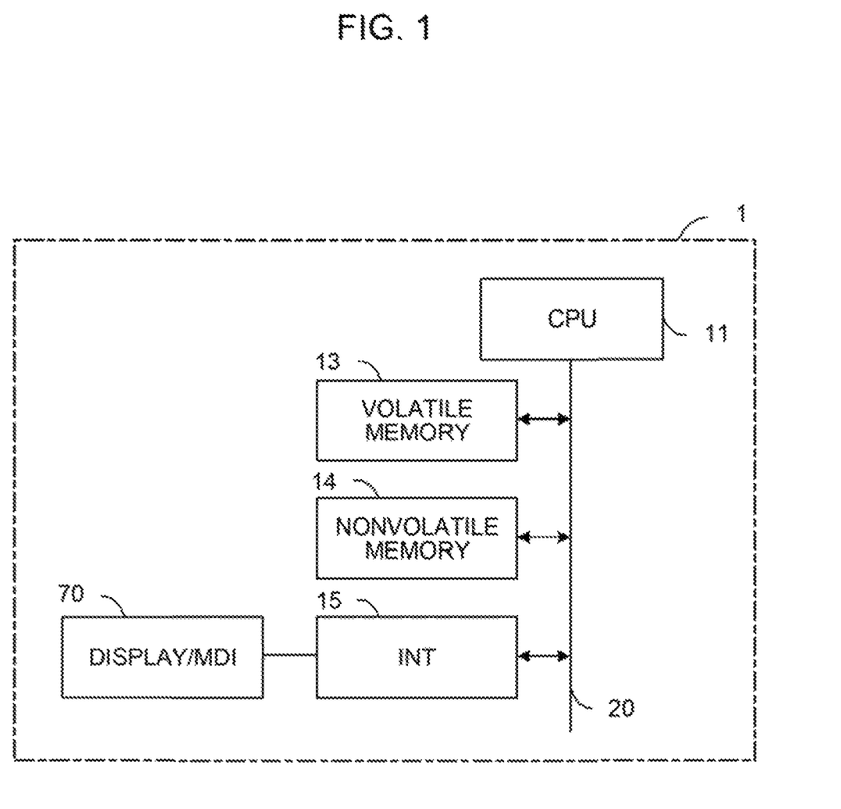
FIG. 1 is a block diagram illustrating a hardware configuration of a numerical controller.

FIG. 1 is a hardware configuration diagram that schematically illustrates an essential part of the numerical controller 1 according to an embodiment of the present invention.

A central processing unit (CPU) 11 included in the numerical controller 1 is a processor that entirely controls the numerical controller 1. The CPU 11 reads out a program stored in a nonvolatile memory 14 via a bus 20, and controls an entire of the numerical controller 1 according to the program.

The nonvolatile memory 14 is configured as a memory in which a storage state can be kept even after a power of the numerical controller 1 is turned off, for example, by being backed up by a battery that is not illustrated. Program, data and the like stored in the nonvolatile memory 14 may be loaded into a volatile memory 13 when they are used. In the volatile memory 13, beside the programs and data loaded from the nonvolatile memory 14, temporary calculation data, display data, input data that is input via an input device and the like are stored.

A display/manual data input (MDI) unit 70 is a data input/output device provided with a display, a keyboard and the like. A command and data input from the keyboard of the display/MDI unit 70 are transferred via an interface 15 to the CPU 11. Further, display data output from the CPU 11 is transferred via the interface 15 so as to be displayed on the display of the display/MDI unit 70.

Figure 2:
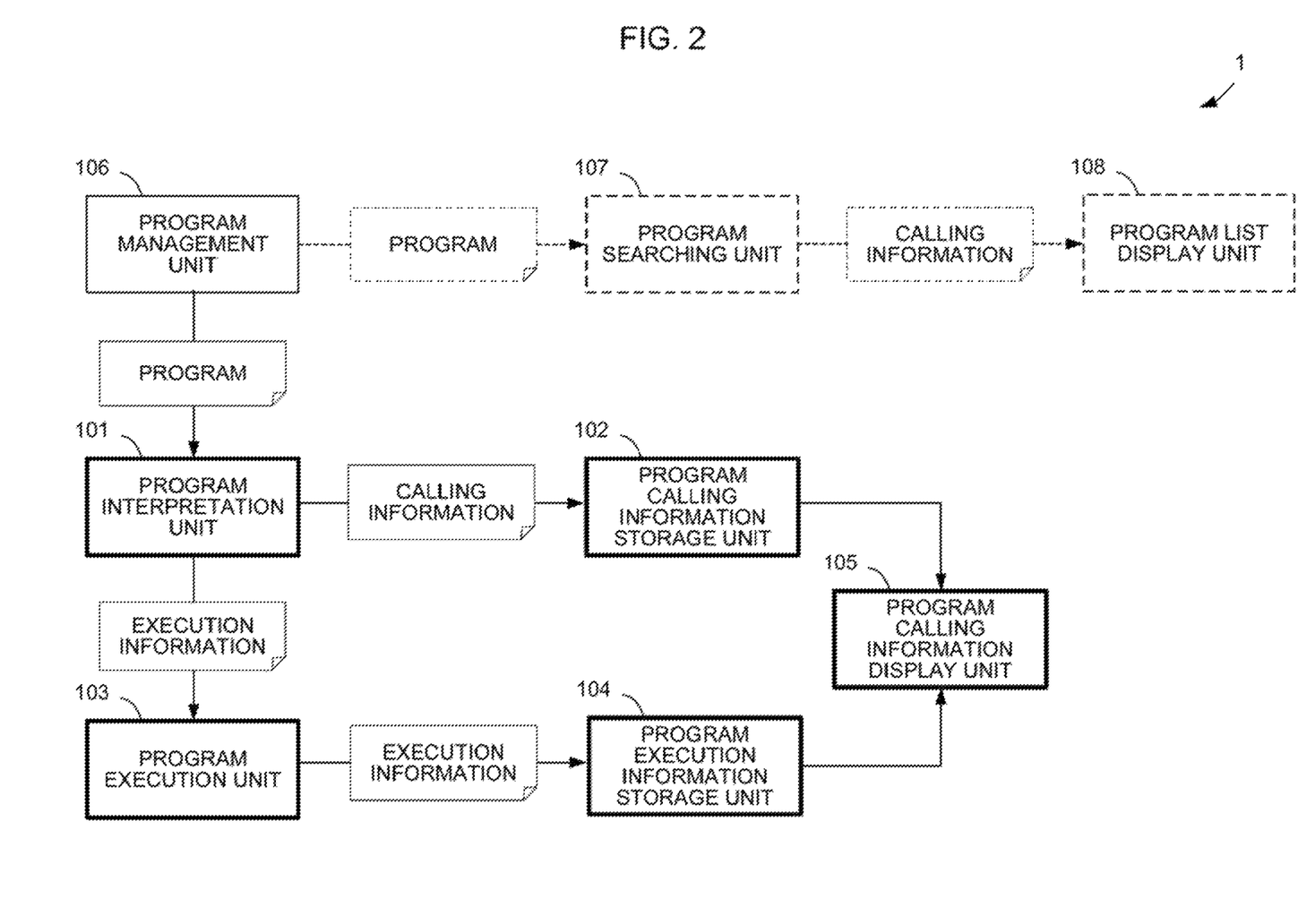
FIG. 2 is a block diagram illustrating a functional configuration of the numerical controller.

FIG. 2 is a block diagram that schematically illustrates a functional configuration of the numerical controller 1 according to an embodiment of the present invention.

The numerical controller 1 includes a program interpretation unit 101, a program calling information storage unit 102, a program execution unit 103, a program execution information storage unit 104, a program calling information display unit 105, a program management unit 106, a program searching unit 107 and a program list display unit 108. Among them, the program interpretation unit 101, the program calling information storage unit 102, the program execution unit 103, the program execution information storage unit 104 and the program calling information display unit 105 execute dynamic analysis machining of programs, which is the feature of one embodiment of the present invention. The program searching unit 107 and the program list display unit 108 analyze programs statically according to the conventional art.

The program management unit 106 is a storage area that stores a plurality of programs including a main program and a subprogram.

The program searching unit 107 processes searching of a program that is controlled by the program management unit 106.

The program list display unit 108 displays a search result by the program searching unit 107. That is, the program list display unit 108 displays an execution result of the static analysis result of the program.

The program interpretation unit 101 reads out the program from the program management unit 106, interprets a program code as preprocessing of the program execution, and outputs a command that is to be executed to the program execution unit 103. In the case where the program code includes references to a macro variable, a parameter or an internal parameter, the program interpretation unit 101 acquires the current macro variable, parameter or internal parameter and subsequently interprets the program code.

Moreover, in the case where the program code includes subprogram call, the program interpretation unit 101 notifies information related to the call such as a means and a variable used for the call, and a program name that is to be called to the program calling information storage unit 102.

The program calling information storage unit 102 creates a table based on the notified information, and stores the information as calling information of the subprogram.

Figure 3:
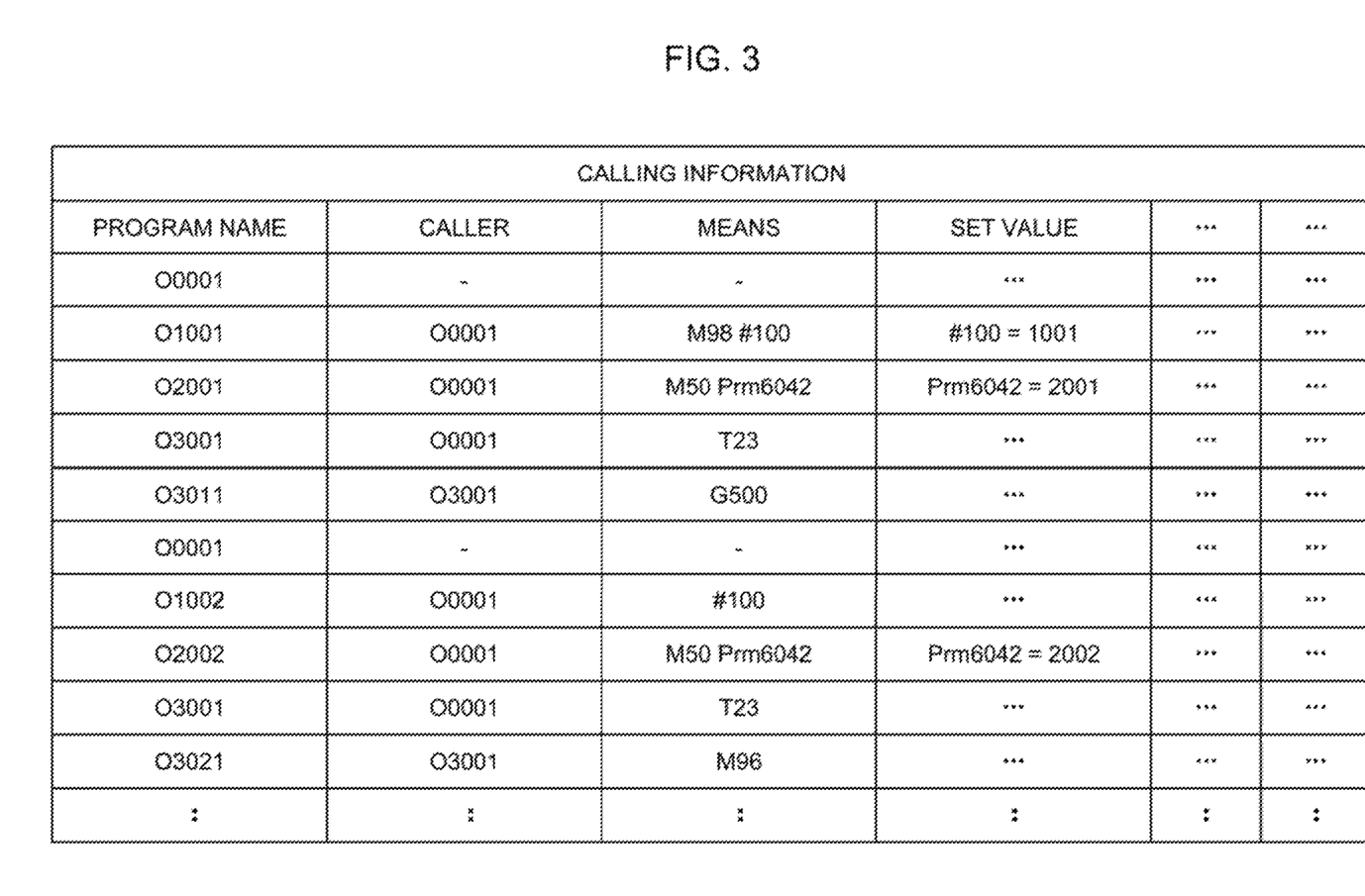
FIG. 3 is a view illustrating an example of program calling information stored in a program calling information storage unit.

FIG. 3 illustrates an example of the program calling information stored in the program calling information storage unit 102. In this example, a "program name" representing a name of the called subprogram, a "caller" representing a program name that has called the subprogram, a "means" representing a code (a command, a variable name or the like) used for calling the subprogram, a "set value" representing a value of the variable used for calling the subprogram and the like are stored to be associated to each other. Values such as "M98" and "M50" recorded in a "Means" column in FIG. 3 denote commands, and values such as "#100" and "Prm6042" after the command denote variable names. Values such as "#100=1001" and "Prm6042=2001" recorded in a "Set Value" column represent that a value of a variable (a macro variable in this case) of #100 is 1001 and that a value of a variable (a parameter of the numerical controller in this case) of Prm6042 is 2001, respectively.

The program execution unit 103 receives an interpretation result of the program code by the program interpretation unit 101 so as to execute the command. At this time, the program execution unit 103 notifies information related to the execution such as a name of the executed program and an execution time of the program to the program execution information storage unit 104.

The program execution information storage unit 104 creates a table based on the notified information, and stores this table as the execution information of the subprogram.

Figure 4:
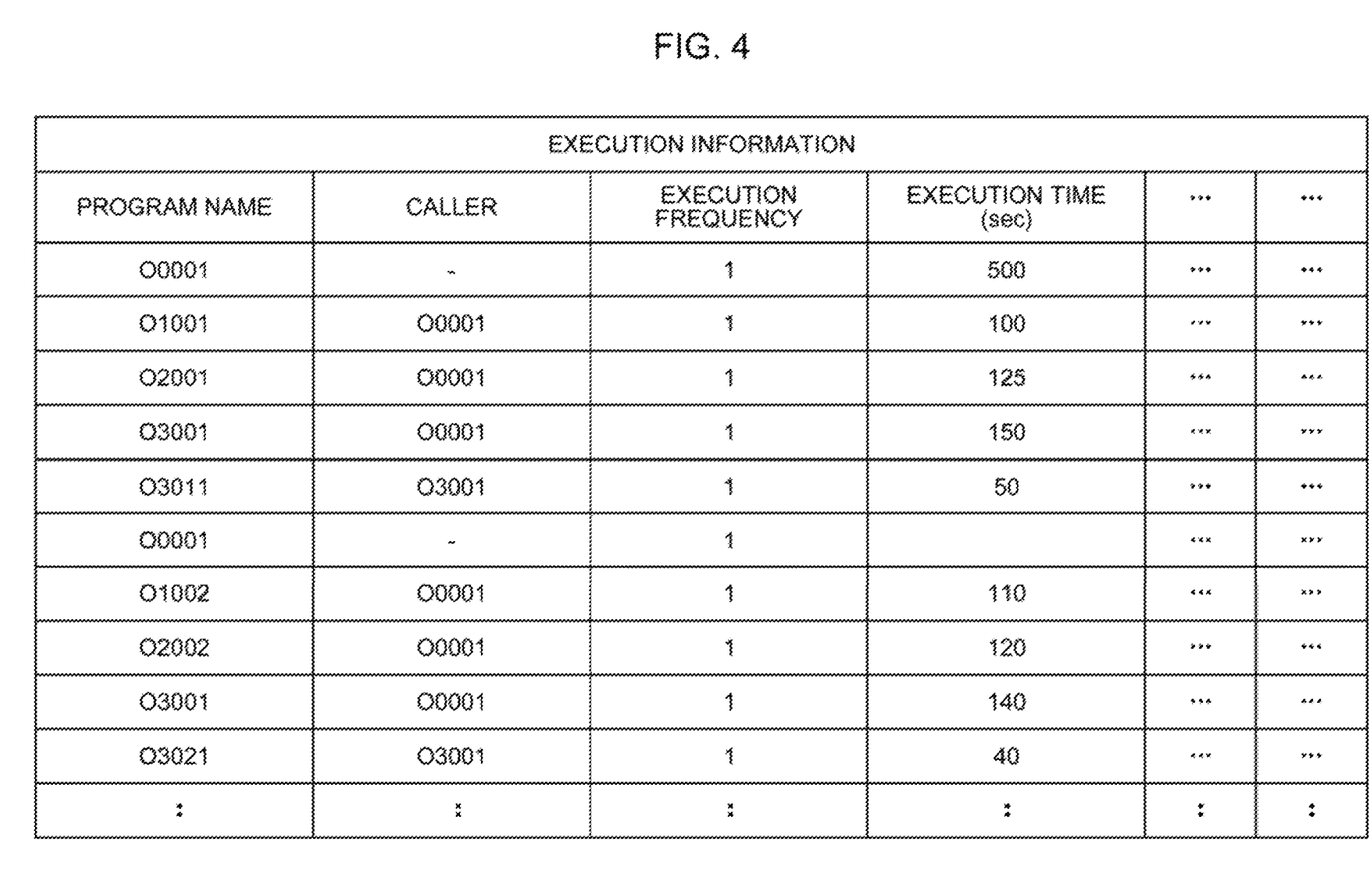
FIG. 4 is a view illustrating an example of program execution information stored in a program execution information storage unit.

FIG. 4 illustrates an example of the program execution information that is stored in the program execution information storage unit 104. In this example, a "program name" representing a name of the executed program, a "caller" representing a program name of the calling side in the case where the executed program has been called and executed by other program, an "execution frequency" representing how many times the program has been executed by one command, an "execution time" (sec) representing a time period that has been required for executing the program once and the like are stored to be associated to each other.

The program execution information as shown in FIG. 4 can be formed by various methods. For example, the program execution unit 103 can form the program execution information from the beginning based on the information obtained when actually executing the program. In this case, the record contained in the program execution information is related only to the actually executed program. That is, the record with the "execution frequency" of zero is not formed.

Alternatively, the program execution unit 103 can form the program execution information also by adding information to the program calling information that is stored in the program calling information storage unit 102. That is, when the program execution unit 103 executes the program, the program execution unit 103 adds the "execution frequency" and the "execution time" of the program to its corresponding record of the program calling information. For example, there is a case where, when the program interpretation unit 101 interprets a code, only a reservation for calling a subprogram is made, and actual calling is executed when the program execution unit 103 receives a trigger such as an external signal. According to this method, in such a case, a subprogram for which a call reservation is made but the call is not actually executed also emerges as a record with the "execution frequency" of zero in the program execution information.

Alternatively, the program execution unit 103 can also form the program execution information also by forming a list of all program names owned by the program management unit 106 and adding to this list. Also in this case, the subprogram for which a calling reservation is executed but the call is not actually executed emerges as a record with the "execution frequency" of zero in the program execution information. In addition, the program for which even a calling reservation is not made, that is, the program that is never called by other program also emerges as a record with the "execution frequency" of zero in the program execution information.

The program calling information display unit 105 organizes and displays relations between calling programs and called programs among a plurality of programs according to the information stored in the program calling information storage unit 102 and the program execution information storage unit 104. The program calling information display unit 105 can identify the subprogram that has actually been called by integrating the program calling information storage unit 102 and the program execution information storage unit 104. Further, the program calling information display unit 105 can also identify a situation when the actual call has been executed (a condition of executing the call, an actual executing situation and the like). By incorporating such various information, the program calling information display unit 105 can provide useful information that has never obtained conventionally to users.

Figure 5:
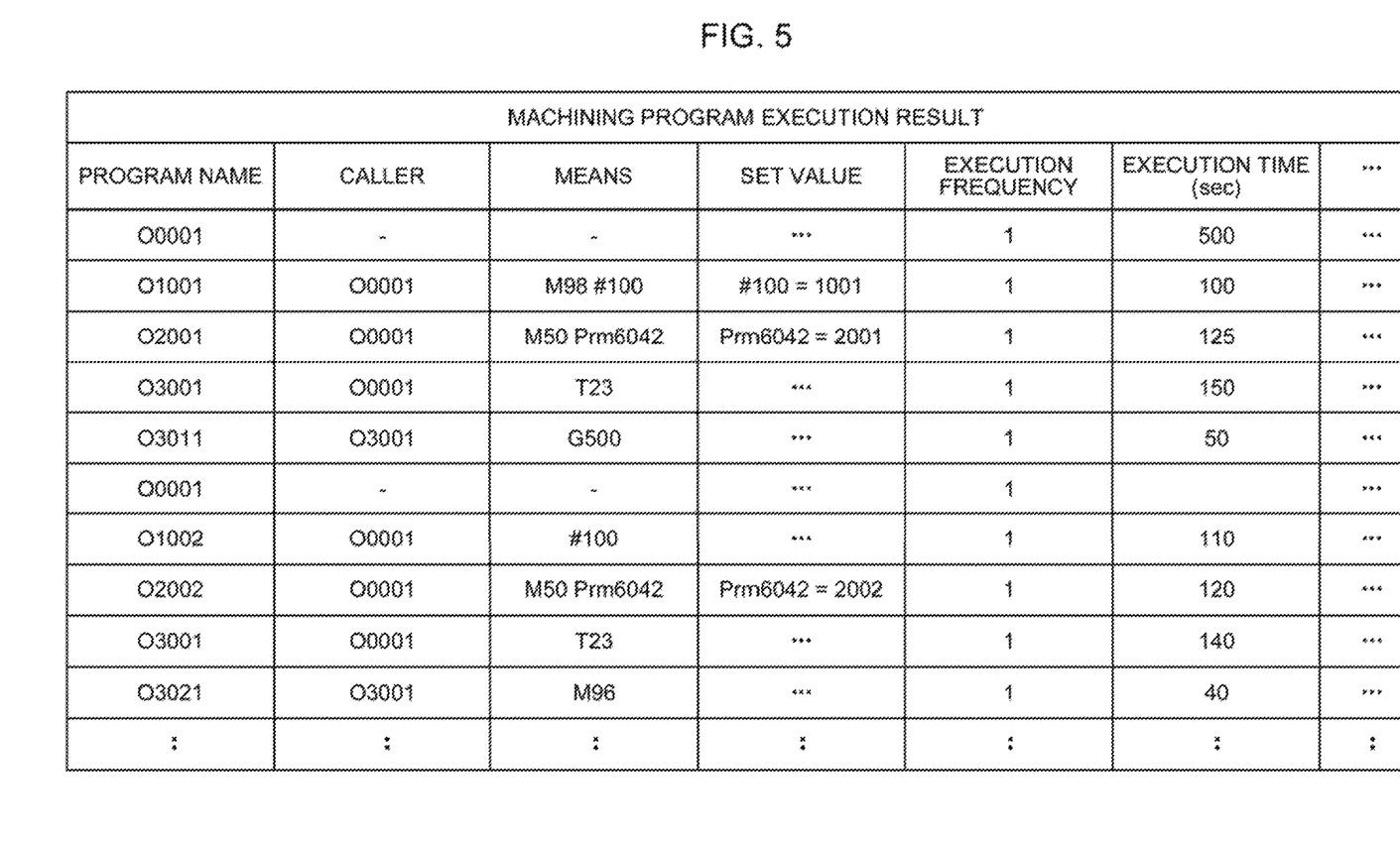
FIG. 5 is a view illustrating an example of information that is formed by the program calling information display unit by integrating the program calling information storage unit and the program execution information storage unit.

The table shown in FIG. 5 is formed by integrating the program calling information storage unit 102 and the program execution information storage unit 104 by the program calling information display unit 105. According to FIG. 5, the "program name" representing a name of a called program, the "caller" representing a name of a program that has called the program, the "means" and the "set value" that represent conditions when executing the call, the "execution frequency" and the "execution time" that represent an executing situation of the program, and the like can be managed unitarily. The program calling information display unit 105 can visually express the relations between the programs based on the integrated information. Some expression methods will be exemplified as follows.

Figure 6:
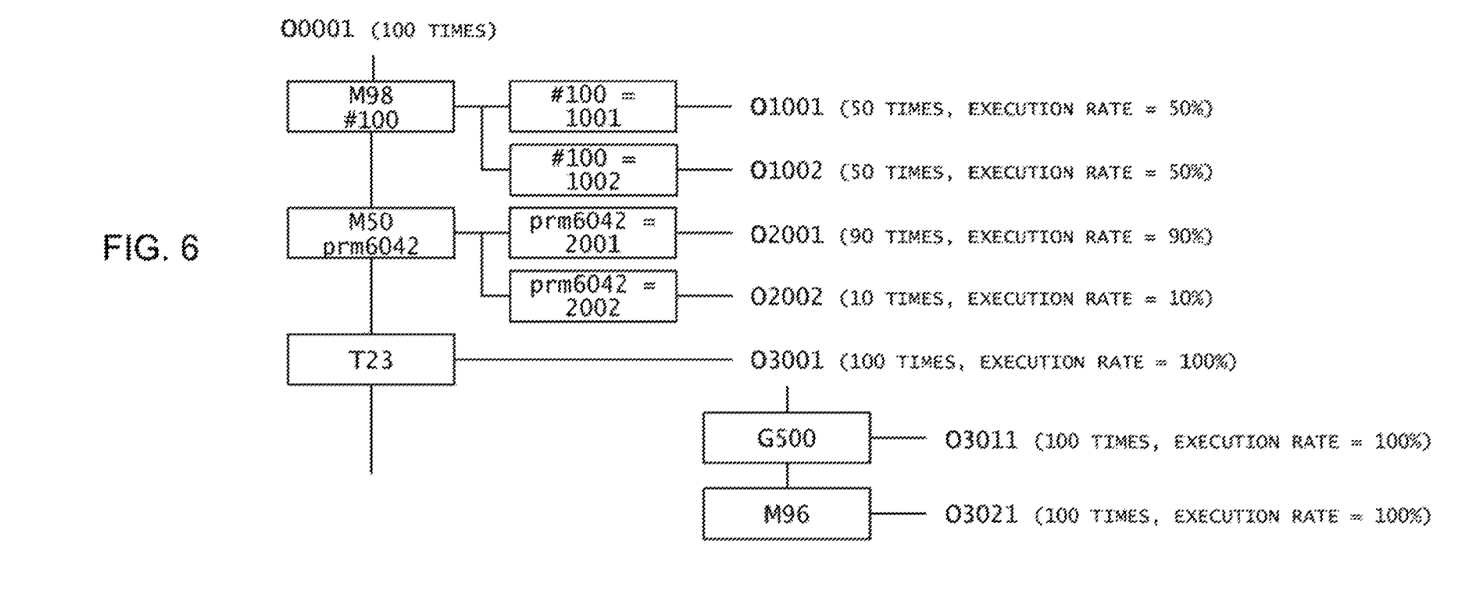
FIG. 6 is a view illustrating an example of a dynamic analysis result displayed by the program calling information display unit.

FIG. 6 illustrates an example of a dynamic analysis result displayed by the program calling information display unit 105, and is a view expressing calling relations of the programs by a tree structure. In this example, a node of "O0001" that is a root of the tree structure denotes a name of the main program. A line segment that is extended from "O0001" as a starting point represents a time course according to the execution of the program. Nodes such as "O1001", "O1002" and the like beyond line segments branched from this line segment respectively represent names of subprograms which have been called by the main program and have actually been executed. Conditions such as "M98 #100", "#100=1001", "#100=1002" and the like described on the line segments represent conditions when their execution routes shown by the line segments are chosen (commands, values of variables and the like), respectively. Further, "100 times", "50 times" and the like described with the respective nodes of "O0001", "O1001" and the like denote the numbers of times that the programs have been executed according to the nodes. Moreover, execution rates such as "50%", "50%" and the like, which are described with the nodes of "O1001", "O1002" and the like at branch destinations, respectively denote rates at which the programs according to the respective nodes are executed in the case where there are a plurality of the nodes at the branch destinations.

For example, the description of "O0001 (100 times)" in FIG. 6 denotes that the main program of "O0001" has been executed 100 times in total. Then, on the route from the main program of "O0001" to the subprogram of "O1001", the conditions of "M98 #100" and "#100=1001" are described. They denote that the code of "M98 #100" has been executed in the main program of "O0001", a value of the macro variable of "#100" at this time is "=1001", and the subprogram of "O1001" has been called and executed. Similarly, FIG. 6 shows that the code of "M98 #100" in the main program of "O0001" has been executed and in the case where a value of the macro variable of "#100" at this time has been "=1002", subprogram of "O1002" has been called and executed. Then, descriptions of "O1001 (50 times, 500)" and "O1002 (50 times, 50%)" denote that each of the subprograms of "O1001" and "O1002" has been executed 50 times in total, and a ratio between their execution frequencies has been 50:50.

Figure 7:
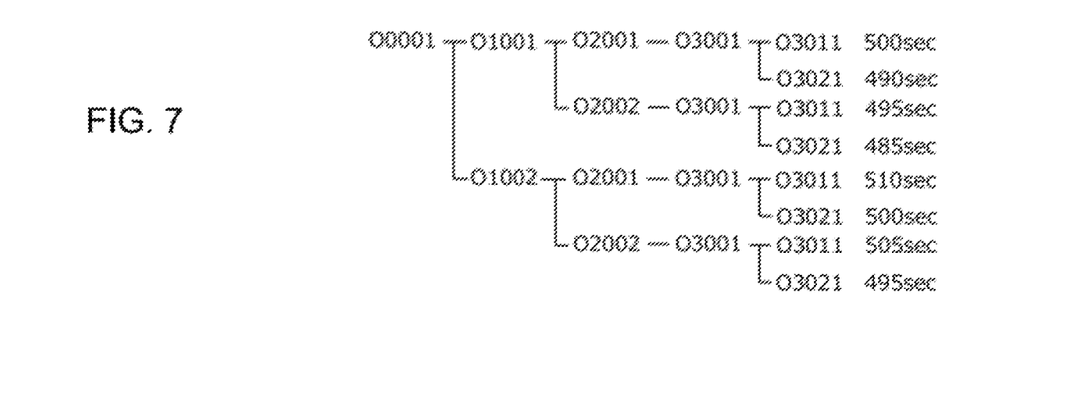
FIG. 7 is a view illustrating an example of a dynamic analysis result displayed by the program calling information display unit.

FIG. 7 illustrates an example of a dynamic analysis result displayed by the program calling information display unit 105, and is a view that expresses calling relations of the programs by a tree structure. In this example, a node of "O0001" that is a root of the tree structure represents a name of the main program. A line segment that is extended from "O0001" as a starting point represents a time course according to the execution of the program. Nodes of "O1001" and "O1002" beyond line segments branched from this line segment respectively represent name of subprograms which have been called by the main program and have actually been executed. Then, nodes of "O2001" and "O2002" beyond a branch that is extended further from the subprogram of "O1001" represent names of subprograms that have been called by the subprogram of "O1001" and have actually been executed, respectively. Similarly, a multiple calling structure of the programs is expressed like a tree. Time such as "500 sec", "490 sec" and the like that are described with terminal nodes of "O3001", "O3002" and the like respectively denote time required for execution of respective series (program execution routes from the root node of "O0001" to the terminal nodes).

For example, FIG. 7 illustrates that the subprograms of "O1001" and "O1002" have been called by the main program of "O0001" and have been executed, and then, the subprograms of "O2001" and "O2002" have further been called by the subprogram of "O1001" and have been executed. Further, FIG. 7 illustrates that "O3001" have been called by "O2001" and "O3011" and "O3021" have been called by "O3001". Moreover, FIG. 7 illustrates that time required for executing "O0001" to "O3011" has been "500 sec", and time required for executing "O0001" to "O3021" has been "490 sec". Such information can be utilized as a material for examining, for example, what program is to be created for saving such execution time.

Further, the program calling information display unit 105 can also form and display a list of called programs and a list of programs that have not been called. For example, the program calling information display unit 105 compares the list of all program names owned by the program management unit 106 with a list of the program names each of which has one or more "execution frequency" in the program execution information shown in FIG. 4 or in the integrated information shown in FIG. 5. The program names which were matched in both lists in this comparison are added into the list of the called programs. Whereas, there is no record that the programs whose names exist only in the list of the all program names owned by the program management unit 106 have been executed, and thus program names that exist only in the list of the all program names owned by the program management unit 106 are added into the list of the programs that have not been called. The program calling information display unit 105 can provide these lists, for example, in a form of list tables to users.

Moreover, the program calling information display unit 105 also can form and display a list of subprograms that have been reserved to be called but have not actually been called. For example, the program calling information display unit 105 compares the program execution information (including only the program names that were actually executed) formed by the program execution unit 103 from the beginning with the program calling information stored in the program calling information storage unit 102. Herein, there is no record that the programs whose names exist only in the program calling information have been executed, and thus the program names that exists only in the program calling information are added into the list of the programs that have been reserved to be called but have not actually been called. The program calling information display unit 105 can provide these lists, for example, in a form of list tables to users.

According to the present embodiment, the numerical controller 1 records the conditions when the programs have actually been called, execution states and the like. Then, the numerical controller 1 can visually display the calling structure among the programs based on the record, can display the list of the programs that have actually been called or not been called, and can display the list of the programs that have been reserved to be called but have not been executed. All of them are information that have not been able to be obtained by the conventional static analysis.

The present invention is not limited to the above-described embodiment, and can be carried out in various forms by adding changes as appropriate. For example, the visual expression method shown in the above embodiment is just an example, and various information obtained from the program calling information and the program execution information can be provided in other methods.

Further, in the above-described embodiment, all of the program interpretation unit 101, the program calling information storage unit 102, the program execution unit 103, the program execution information storage unit 104, the program calling information display unit 105 and the program management unit 106 are explained as existing in the numerical controller 1. However, the present invention is not limited to this configuration, and one or more machining units may exist in other device that can communicate with the numerical controller 1 via a network or the like. For example, the program calling information storage unit 102, the program execution information storage unit 104, the program calling information display unit 105 and the like can be provided in a device other than the numerical controller 1.

Alternatively, the program interpretation unit 101, the program calling information storage unit 102, the program execution unit 103, the program execution information storage unit 104, the program calling information display unit 105 and the program management unit 106 may exist in a simulator of the numerical controller. Also in this case, one or more machining units may exist in other device that communicates with the simulator via a network or the like.

The invention claimed is:

1. A numerical controller comprising:
a memory configured to store a plurality of subprograms; and
a processor configured to:
control a machining tool to machine a workpiece by executing a machining program; and
analyze the machining program by:
determining a first information related to a call of at least one subprogram of the plurality of subprograms in a case where the call of the at least one subprogram is included in the machining program,
storing the first information related to the call of the at least one subprogram,
in response to execution of the at least one subprogram during the execution of the machining program, determining a second information related to execution of the at least one subprogram, storing the second information, and combining the second information with the first information,
wherein the second information related to the execution of the at least one subprogram includes information on an execution frequency that is a percentage of times that the at least one subprogram is executed with respect to a number of times the program is executed, and an execution time of the at least one subprogram,
form a primary name list of all the subprograms stored in the memory, by adding the first information and the second information to the primary name list, and
form and display a secondary name list including:
a subprogram that is reserved to be called by interpreting a code in the machining program, and is not executed, and
a subprogram that is not reserved to be called and is never called by another program.

2. The numerical controller according to claim 1, wherein the processor is further configured to:
display a calling structure of the executed subprogram by a tree view based on the first information.

3. The numerical controller according to claim 1, wherein the processor is further configured to:

output a list of the executed subprogram based on the second information.

\* \* \* \* \*